United States Patent
Lahiri et al.

(10) Patent No.: US 9,432,394 B1
(45) Date of Patent: Aug. 30, 2016

(54) METHODS, SYSTEMS, AND COMPUTER READABLE MEDIA FOR CONVERGING ON NETWORK PROTOCOL STACK VULNERABILITIES USING FUZZING VARIABLES, VULNERABILITY RATINGS AND PROGRESSIVE CONVERGENCE

(71) Applicant: Ixia, Calabasas, CA (US)

(72) Inventors: Abhijit Lahiri, Kolkata (IN); Kingshuk Mandal, Kolkata (IN)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/659,309

(22) Filed: Mar. 16, 2015

(51) Int. Cl.
*H04L 29/06* (2006.01)
*G06F 21/55* (2013.01)

(52) U.S. Cl.
CPC ......... *H04L 63/1433* (2013.01); *G06F 21/552* (2013.01); *H04L 63/1416* (2013.01)

(58) Field of Classification Search
CPC ............. G06F 21/552; H04L 63/1416; H04L 63/1433
See application file for complete search history.

(56) References Cited

U.S. PATENT DOCUMENTS

| | | | |
|---|---|---|---|
| 5,822,520 A | 10/1998 | Parker | |
| 6,353,446 B1 | 3/2002 | Vaughn et al. | |
| 6,639,607 B1 | 10/2003 | Ferguson et al. | |
| 6,671,869 B2 | 12/2003 | Davidson et al. | |
| 6,707,474 B1 | 3/2004 | Beck et al. | |
| 6,757,742 B1 | 6/2004 | Viswanath | |
| 6,814,842 B1 | 11/2004 | Yago et al. | |
| 6,862,699 B2 | 3/2005 | Nakashima et al. | |
| 6,931,574 B1 | 8/2005 | Coupal et al. | |
| 6,941,551 B1 | 9/2005 | Turkoglu | |
| 6,988,208 B2 | 1/2006 | Hrabik et al. | |
| 7,047,297 B2 | 5/2006 | Huntington et al. | |
| 7,278,061 B2 | 10/2007 | Smith | |

(Continued)

FOREIGN PATENT DOCUMENTS

| WO | WO 2013/087982 A1 | 6/2013 |
|---|---|---|
| WO | WO 2013/192086 A1 | 12/2013 |
| WO | WO 2015/171599 A1 | 11/2015 |

OTHER PUBLICATIONS

Applicant-Initiated Interview Summary for U.S. Appl. No. 14/270,333 (Apr. 4, 2016).

(Continued)

*Primary Examiner* — Dao Ho
(74) *Attorney, Agent, or Firm* — Jenkins, Wilson, Taylor & Hunt, P.A.

(57) ABSTRACT

A method for progressive convergence on network protocol stack vulnerabilities includes defining an initial protocol field and field value space for fuzz testing of a network communications protocol stack implementation. The method further includes dividing the initial space into regions corresponding to combinations of protocol fields and field values. The method further includes assigning vulnerability ratings to at least some of the regions. The method further includes executing fuzz testing of the network communications protocol stack implementation using the protocol fields and field values corresponding to the regions. The method further includes updating the vulnerability ratings of the regions based on results of the testing. The method further includes identifying, based on the updated vulnerability ratings, at least one region with a higher vulnerability rating than other regions. The method further includes performing fuzz testing for the sub-regions.

18 Claims, 6 Drawing Sheets

(56) References Cited

U.S. PATENT DOCUMENTS

| | | | |
|---|---|---|---|
| 7,735,141 B1* | 6/2010 | Noel | H04L 63/1425 |
| | | | 709/223 |
| 7,818,788 B2 | 10/2010 | Meier | |
| 7,926,114 B2 | 4/2011 | Neystadt et al. | |
| 8,046,720 B2 | 10/2011 | Wirth | |
| 8,407,798 B1 | 3/2013 | Lotem et al. | |
| 8,745,592 B1 | 6/2014 | Ormandy et al. | |
| 8,819,834 B2 | 8/2014 | Petrica et al. | |
| 2002/0186697 A1 | 12/2002 | Thakkar | |
| 2002/0198985 A1 | 12/2002 | Fraenkel et al. | |
| 2003/0014669 A1 | 1/2003 | Caceres et al. | |
| 2003/0036896 A1 | 2/2003 | Skingsley et al. | |
| 2003/0131098 A1 | 7/2003 | Huntington et al. | |
| 2003/0145039 A1 | 7/2003 | Bonney et al. | |
| 2003/0172177 A1 | 9/2003 | Kersley et al. | |
| 2004/0025015 A1* | 2/2004 | Satterlee | G06F 21/51 |
| | | | 713/164 |
| 2004/0068681 A1 | 4/2004 | Smith | |
| 2004/0250124 A1* | 12/2004 | Chesla | G06F 21/552 |
| | | | 726/13 |
| 2005/0235263 A1 | 10/2005 | Bundy et al. | |
| 2007/0006041 A1 | 1/2007 | Brunswig et al. | |
| 2007/0192863 A1* | 8/2007 | Kapoor | G06F 9/505 |
| | | | 726/23 |
| 2008/0095102 A1* | 4/2008 | Meng | H04W 74/04 |
| | | | 370/329 |
| 2008/0262990 A1* | 10/2008 | Kapoor | G06F 9/505 |
| | | | 706/20 |
| 2008/0288822 A1 | 11/2008 | Wu et al. | |
| 2008/0301647 A1 | 12/2008 | Neystadt et al. | |
| 2008/0301813 A1 | 12/2008 | Neystadt et al. | |
| 2008/0320328 A1 | 12/2008 | O'Leary | |
| 2009/0077666 A1* | 3/2009 | Chen | G06F 21/577 |
| | | | 726/25 |
| 2009/0252046 A1* | 10/2009 | Canright | H04L 41/22 |
| | | | 370/250 |
| 2009/0327943 A1 | 12/2009 | Medvedev et al. | |
| 2009/0328190 A1 | 12/2009 | Liu et al. | |
| 2010/0058475 A1 | 3/2010 | Thummalapenta et al. | |
| 2010/0100871 A1 | 4/2010 | Celeskey et al. | |
| 2011/0078798 A1 | 3/2011 | Chen et al. | |
| 2011/0214157 A1* | 9/2011 | Korsunsky | G06F 21/55 |
| | | | 726/1 |
| 2011/0302455 A1 | 12/2011 | Thomas et al. | |
| 2012/0084756 A1 | 4/2012 | Subramanian et al. | |
| 2012/0089868 A1 | 4/2012 | Meijer et al. | |
| 2013/0259370 A1* | 10/2013 | Tang | G06K 9/38 |
| | | | 382/169 |
| 2014/0047275 A1 | 2/2014 | Eddington | |
| 2015/0319072 A1 | 11/2015 | Chakrabarti et al. | |

OTHER PUBLICATIONS

Non-Final Office Action for U.S. Appl. No. 14/270,333 (Jan. 22, 2016).

Notification of Transmittal of the International Search Report and the Written Opinion of the International Searching Authority, or the Declaration for International Application No. PCT/US2015/029225 (Aug. 10, 2015).

Commonly-assigned, co-pending U.S. Appl. No. 14/658,860 for "Methods, Systems, and Computer Readable Media for Simplistic Visual Representation of Complex Interdependent Network Protocol Fields for Network Protocol Fuzzing and Graphical Framework for Reporting Instantaneous System Level Progress," (Unpublished, filed Mar. 16, 2015).

Notice of Allowance and Fee(s) Due for U.S. Appl. No. 13/527,565 (Apr. 25, 2014).

Final Office Action for U.S. Appl. No. 13/527,565 (Jan. 3, 2014).

"Wireshark," http://web.archive.org/web/20131231064122/http://en.wikipedia.org/wiki/Wireshark, pp. 1-6 (Dec. 2013).

Notification of Transmittal of the International Search Report and the Written Opinion of the International Searching Authority, or the Declaration for International Application No. PCT/US2013/046129 (Nov. 8, 2013).

Non-Final Office Action for U.S. Appl. No. 13/527,565 (Jul. 30, 2013).

"IxNetwork," http://www.ixiacom.com/products/ixnetwork, PN: 915-3003-01, Rev. B., pp. 1-4 (May 2011).

Gorbunov et al. "AutoFuzz: Automated Network Protocol Fuzzing Framework", International Journal of Computer Science and Network Security, vol. 10, No. 8, pp. 239-245 (Aug. 2010).

Abdelnur et al., "KiF: A stateful SIP Fuzzer", Proceedings of the 1st international conference on Principles, systems and applications of IP telecommunications, pp. 47-56 (2007).

Banks et al., "SNOOZE: Toward a Stateful NetwOrk prOtocol fuzZEr", Information Security, pp. 343-358 (2006).

Allen et al., "A Model-based Approach to the Security Testing of Network Protocol Implementations," IEEE, Department of Computer Sciences, Florida Institute of Technology, pp. 1-8 (Copyright 2006).

Screenshot of antiparser, antiparser.sourceforge.net (Aug. 17, 2005).

Aitel, "An Introduction to SPIKE, the Fuzzer Creation Kit", Immunity Inc., White Paper, pp. 1-32 (2004).

Screenshot of Autodafé, an Act of Software Torture, autodafe.sourceforge.net (Copyright 2004-2006).

Wieser et al., "Security testing of SIP implementations", Technical Report, Columbia University, Department of Computer Science, pp. 1-7 (2003).

Amini et al., "Sulley: Fuzzing Framework", www.fuzzing.org/wp-content/SulleyManual.pdf (Publication Date Unknown).

Screenshot of VDA Labs, www.vdalabs.com/tools/efs_gpf.html (Publication Date Unknown).

Screenshot of Peach Fuzzing Platform, peachfuzzer.com (Publication Date Unknown, downloaded from the Internet Aug. 17, 2012).

Notice of Allowance and Fee(s) Due for U.S. Appl. No. 10/316,445 (Jun. 9, 2011).

Notice of Panel Decision from Pre-Appeal Brief Review for U.S. Appl. No. 10/316,445 (Mar. 25, 2011).

Non-Final Official Action for U.S. Appl. No. 10/316,445 (Jan. 4, 2010).

Final Official Action for U.S. Appl. No. 10/316,445 (Jul. 9, 2009).

Non-Final Official Action for U.S. Appl. No. 10/316,445 (Dec. 26, 2008).

Final Official Action for U.S. Appl. No. 10/316,445 (Jul. 9, 2008).

Non-Final Official Action for U.S. Appl. No. 10/316,445 (Dec. 27, 2007).

Screenshot of Ixia PDU Builder Main Screen, p. 1 (May 28, 2002).

Comer, "Internetworking with TCP/IP, vol. 1: Principles, Protocols, and Architecture," Third Edition, pp. 203-204, (1995).

Householder at al., "Probability-Based Parameter Selection for Black-Box Fuzz Testing," Software Engineering Institute, Technical Note, CMU/SEI-2012-TN-019, 30 pgs. (Aug. 2012).

* cited by examiner

METHODS, SYSTEMS, AND COMPUTER READABLE MEDIA FOR CONVERGING ON NETWORK PROTOCOL STACK VULNERABILITIES USING FUZZING VARIABLES, VULNERABILITY RATINGS AND PROGRESSIVE CONVERGENCE

TECHNICAL FIELD

The subject matter described herein relates to testing implementations of communications network protocol stacks. More particularly, the subject matter described herein relates to methods, systems, and computer readable media for converging on network protocol stack vulnerabilities using fuzzing variables, vulnerability ratings and progressive convergence.

BACKGROUND

In communications network equipment, protocol stacks are implemented at least partially software. Vulnerabilities in protocol stack implementations can be introduced by weak coding during development and careless modifications during maintenance. Thus, there exists a possibility of localization of vulnerabilities in specific sections of code. FIG. 1 is a graph illustrating how some areas of code may be more vulnerable than others. In FIG. 1, the three axes respectively illustrate fields, field values, and protocols. The cube represents all of the possible combinations of field, field values, and protocols. The shaded regions in the cube represent combinations of protocols, fields, and field values that are likely to cause a network protocol stack implementation to fail or transition to an invalid state. Due to the sometimes unpredictable nature of software development, the locations of such regions are often unknown and must be identified through testing.

One way to test the vulnerability of the protocol stack is referred to as black box fuzz testing. Black box fuzz testing involves the sending of messages to a protocol stack implementation with one or more field values in the messages being fuzzed or set to algorithmically changed values. The goal of fuzz testing is to identify combinations of fields and field values that cause the network communications protocol stack to fail or transition to an invalid state.

One way to perform black box fuzz testing is utilizing a brute force approach. The brute force approach to black box fuzz testing involves the testing of all possible combinations of protocols, fields, and field values without reducing the size of the parameter space during the testing. Because the parameter space for such brute force testing can be large, such testing is resource intensive and can require significant amounts and/or processing power to identify vulnerabilities. Thus, rather than performing brute force black box fuzz testing, it is desirable to perform fuzz testing in a manner that reduces the parameter space to converge on combinations of parameter values that result in communications network protocol stack vulnerabilities.

Accordingly, there exists a need for methods, systems, and computer readable media for converging on network protocol stack vulnerabilities using fuzzing variables, vulnerability ratings and progressive convergence.

SUMMARY

The subject matter described herein includes methods, systems, and computer readable media for converging on network protocol stack vulnerabilities using fuzzing variables, vulnerability ratings and progressive convergence. One method for progressive convergence on network protocol stack vulnerabilities includes defining an initial protocol field and field value space for fuzz testing of a network communications protocol stack implementation. The method further includes dividing the initial space into regions corresponding to combinations of protocol fields and field values. The method further includes assigning vulnerability ratings to at least some of the regions. The method further includes executing fuzz testing of the network communications protocol stack implementation using the protocol fields and field values corresponding to the regions. The method further includes updating the vulnerability ratings of the regions based on results of the testing. The method further includes identifying, based on the updated vulnerability ratings, at least one region with a higher vulnerability rating than other regions. The method further includes performing fuzz testing for the sub-regions.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 2:
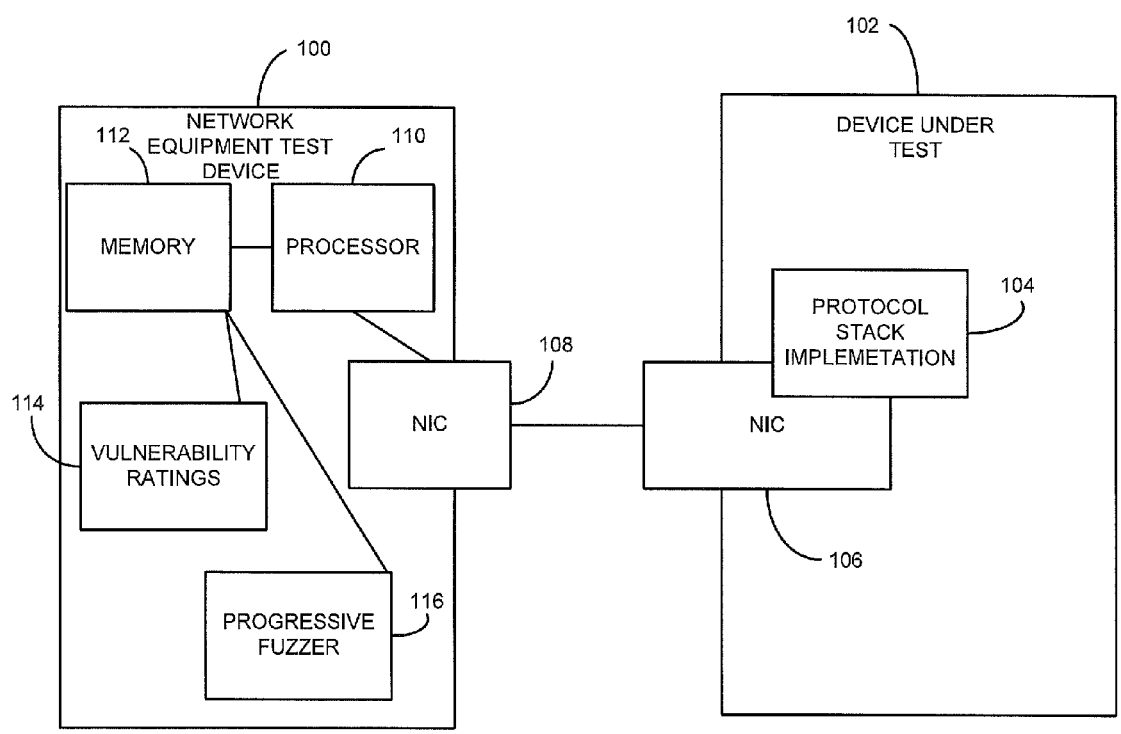
FIG. 2 is a block diagram illustrating a system for converging on network protocol stack vulnerabilities using fuzzing variables, vulnerability ratings, and progressive convergence according to an embodiment of the subject matter described herein.

The subject matter described herein includes methods, systems, and computer readable media for converging on protocol stack vulnerabilities using field values, vulnerability ratings, and progressive convergence. FIG. 2 is a block diagram illustrating an exemplary system for performing such testing according to an embodiment of the subject matter described herein. Referring to FIG. 2, a network equipment test device 100 may implement progressive black box fuzz testing of a device under test 102. More particularly, test device 100 may test an implementation of a network protocol stack 104 that executes on a network interface card 106 or on another processor within device under test 102. Network equipment test device 100 also includes a network interface card 108 for sending test packets to and receiving test packets from device under test 102.

Network equipment test device 100 further includes a processor 110 and memory 112. Processor 110 may be a microprocessor, a field programmable gate array (FPGA) or an application specific integrated circuit (ASIC) that controls testing implemented by network equipment test device 100. Memory 112 may be volatile or non-volatile memory that stores executable instructions executed by processor 110. In the illustrated example, memory 112 stores a vulnerability ratings module 114 and a progressive fuzzer 116. Vulnerability ratings module 114 generates or receives initial vulnerability ratings from a user and provides these ratings to progressive fuzzer 116. Progressive fuzzer 116 implements black box fuzz testing of network protocol stack implementation 104 using the vulnerability ratings to identify progressively smaller subsets of parameters and parameter values to which protocol stack implementation is vulnerable.

Figure 3A:
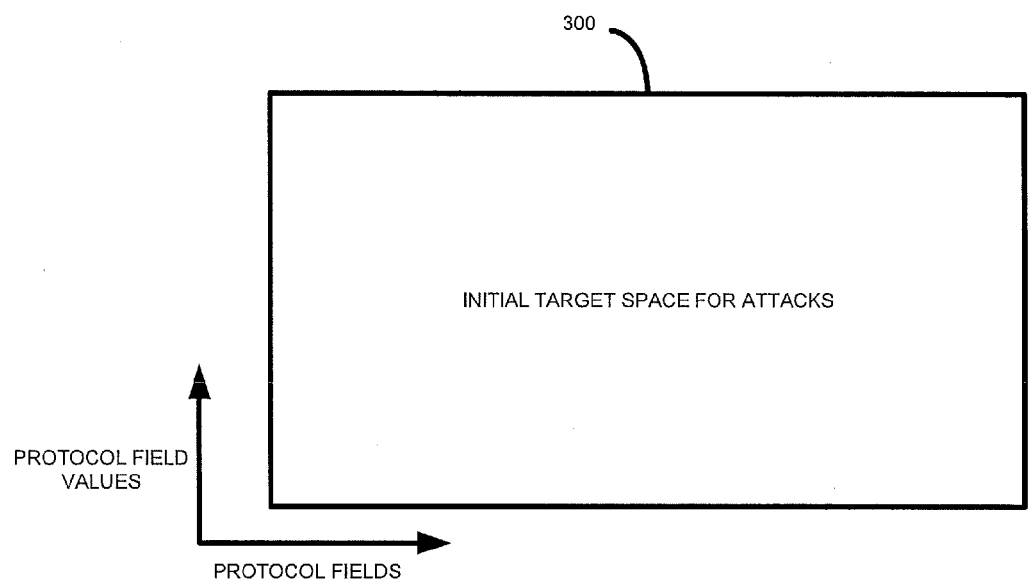
FIGS. 3A-3E illustrate the dividing of the target space for fuzz testing into regions and sub-regions according to an embodiment of the subject matter described herein.

In one embodiment, the user may define an initial target space for progressive fuzzer 116 to initiate testing or "attacks" of a network communications protocol stack. In one example, the target space may be a combination of network communications different protocol fields and ranges of values for those fields. FIG. 3A diagrammatically illustrates an example of an initial target space. In FIG. 3A, the initial target space is represented by a rectangle where the length represents protocol fields and the width represents protocol field values. If the protocol being fuzzed is IP, the horizontal axis in FIG. 3A may represent a set of protocol fields in an IP packet that can be fuzzed. For example, the horizontal axis may represent IP address, type of service, fragment offset, and time to live. The vertical axis in FIG. 3A may represent all possible values of the protocol fields. The possible values of each protocol field depend on the number of bytes in each field. Generally, for binary encoded fields, the number of possible values is $2^{(\# \, of \, bits)}$. However, a user may define a subset, such as a range of field values for each protocol field to be fuzzed. Because fuzz testing typically involves multiple protocols, the number of fields and field values to be fuzzed results in a large potential vulnerability space that must be tested.

The brute force approach to fuzz testing would be to test all possible combinations of protocol fields and field values without regard to relative vulnerabilities of the protocol stack to particular fuzzed field values determined through fuzz testing. Rather than treating the target test space as a single large parameter space for fuzz testing, the target space is divided into regions. In one embodiment, the regions may be equally sized. In an alternate embodiment, the regions may be unequally sized. In addition, although a region may correspond to ranges of one or more protocol field values, the subject matter described herein is not limited to defining regions that include ranges of protocol field values. For example, a region may include discontinuous values of a protocol field, such as odd numbered, even numbered, or pseudo-randomly assigned values. The term "region" as used herein is intended to refer to any suitable subset of a larger space of protocol field and field value combinations.

Figure 3B:
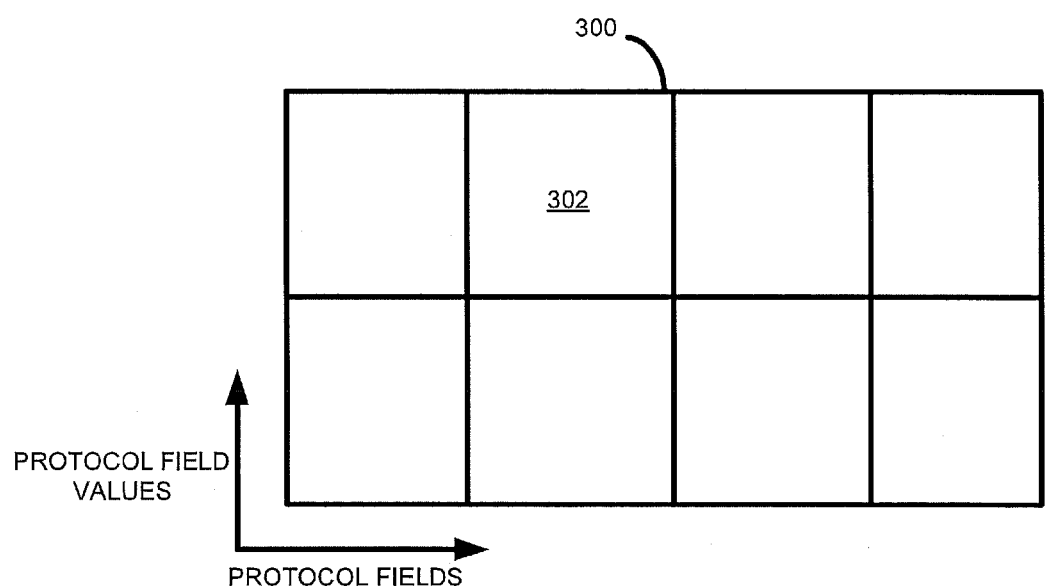

FIG. 3B illustrates the dividing of target space 300 into regions. In the illustrated example, the regions are equally sized and correspond to combinations of protocol fields and field values. To illustrate how protocol field values may be divided into regions, assume a single 8 bit parameter value is being fuzzed. The possible values for the field are 0 to 255. Table 1 shown below illustrates the dividing of the 8 bit parameter space into 8 regions.

TABLE 1

Example Division of an 8-Bit Protocol Field into 8 Regions

| PARAMETER VALUES | REGION |
|---|---|
| 0-31 | 1 |
| 32-63 | 2 |
| 64-95 | 3 |
| 96-127 | 4 |
| 128-159 | 5 |
| 160-191 | 6 |
| 192-223 | 7 |
| 224-255 | 8 |

In Table 1, the 8 bit parameter space is divided into 8 equally sized regions of 32 values each.

Once the test space is divided into regions, the regions are assigned vulnerability ratings. The vulnerability ratings may be initial values assigned by the user or by vulnerability ratings module 114 that indicates an initial vulnerability of network protocol stack implementation 104 to combinations of fields and field values in each region. Table 2 shown below illustrates exemplary vulnerability ratings that may be assigned to network protocol fields:

TABLE 2

Vulnerability Ratings for Network Protocol Field Values

| Vulnerability Rating | 5 (High) | 3 (Medium) | 0 (Low) |
|---|---|---|---|
| Fields | Total Length Fragment Offset Options | IHL Identification Flags | Version DSCP ECN TTL Protocol Header Checksum Source IP Destination IP |

In Table 2, a high vulnerability rating of 5 is assigned to IP header length (IHL), total length, fragment offset, and options. A medium vulnerability rating of 3 is assigned to IHL, identification, and flags. A low vulnerability is assigned to protocol version, differentiated services code point (DSCP), explicit congestion notification (ECN), time to live (TTL), protocol, header checksum, source IP address, and destination IP address. Although not illustrated in Table 1, different vulnerability ratings may be assigned to different values within a network protocol field. For example, IP addresses above a certain value may be associated with a higher vulnerability rating than those below that value.

It should be noted that the initial vulnerability ratings assigned prior to testing may be equal or unequal. For example, assigning initial vulnerability ratings to the regions may include initializing all of the vulnerability ratings to zero or other initial value.

Once the regions have been defined and the initial vulnerability ratings have been assigned, fuzz testing is executed, prioritizing attacks according to the vulnerability ratings. For example, in FIG. 3B, regions with higher vulnerability ratings may be tested prior to or more rigorously than regions with lower vulnerabilities. Based on results of the testing, the vulnerability rating for each region 302 may be updated. In one example, a vulnerability rating for each region 302 is incremented for each time and attack causes a change in the process flow of network protocol stack implementation 104.

Figure 3C:
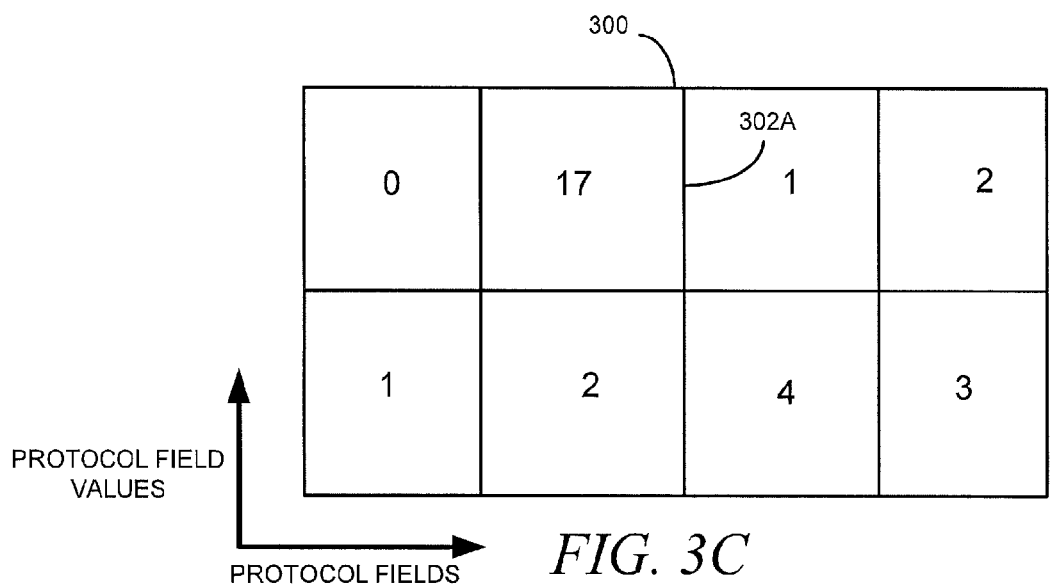
Figure 3D:
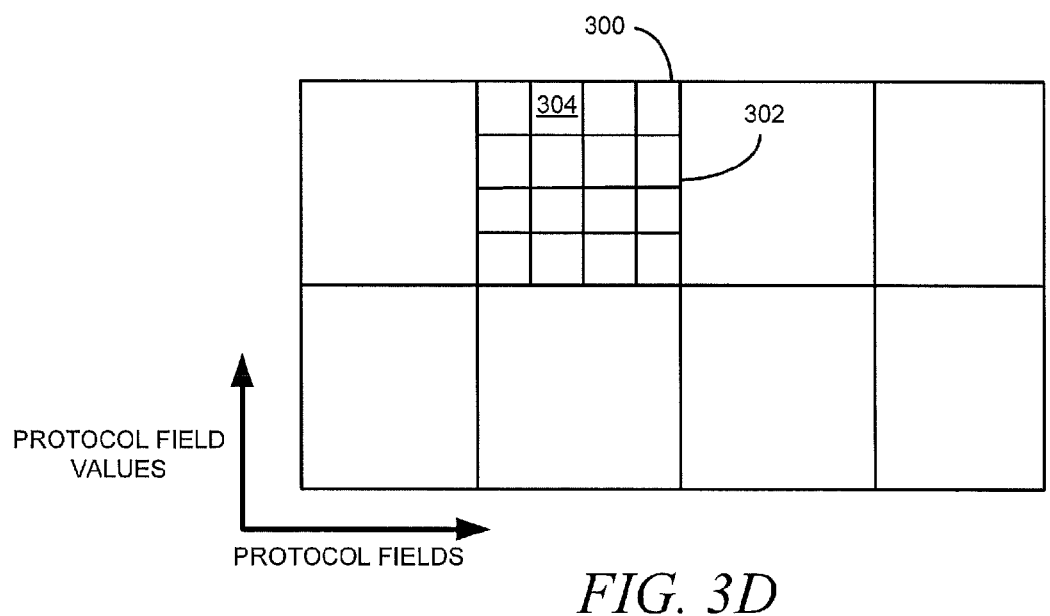
Figure 3E:
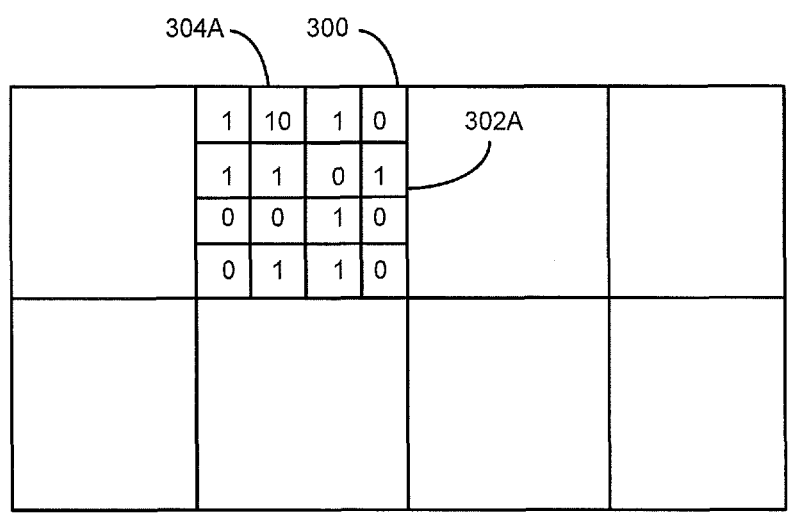

FIG. 3C illustrates updated vulnerability ratings after an initial iteration of vulnerability testing for each of the regions. In FIG. 3C, region 302A has a vulnerability rating of 17, which is the highest of all of the regions in the initial target space. Accordingly, as illustrated in FIG. 3D, region 302A is subdivided into sub-regions 304, and each sub-region is tested to determine its vulnerability rating. The vulnerability ratings of the sub-regions are stored in memory. FIG. 3E illustrates an example of vulnerability ratings of sub-regions 304. In FIG. 3E, a particular sub-region 304A has a value of 10, which means that 10 of the 17 violations occurring in region 302A were caused by parameters in sub-region 304A.

Sub-region 304A may be further subdivided and the testing may be repeated for sub-region 304A. The process of dividing the parameter space into sub-regions and performing black box fuzz testing for the sub-regions may be iteratively repeated in the manner illustrated in FIGS. 3A-3E until the parameter values causing the vulnerabilities are sufficiently localized or the user decides to end the testing. For example, after the first iteration of fuzz testing, the user may know that 17 failures occurred in region 302A but may not know which parameter values within region 302A caused the failures. When the fuzz testing is repeated, sub-region 304A is determined to have 10 of the 17 failures from the previous iteration. The remaining violations are distributed throughout the other sub-regions in region 302A. The user may determine that sub-region 304A is sufficiently small and that the failures are sufficiently clustered in sub-region 304A for further analysis. If the failures had been evenly distributed in the sub-regions, the user may elect to stop the fuzz testing and reconfigure the parameter space.

Once the parameter values causing the vulnerabilities have been sufficiently localized or the testing has ended, the network protocol stack implementation software may be analyzed with respect to the fields and field values that caused the high vulnerability. For example, the code of the network protocol stack may be analyzed using a debugger or other tool separate from fuzzer 116 to identify the cause of the high vulnerabilities.

Figure 4:
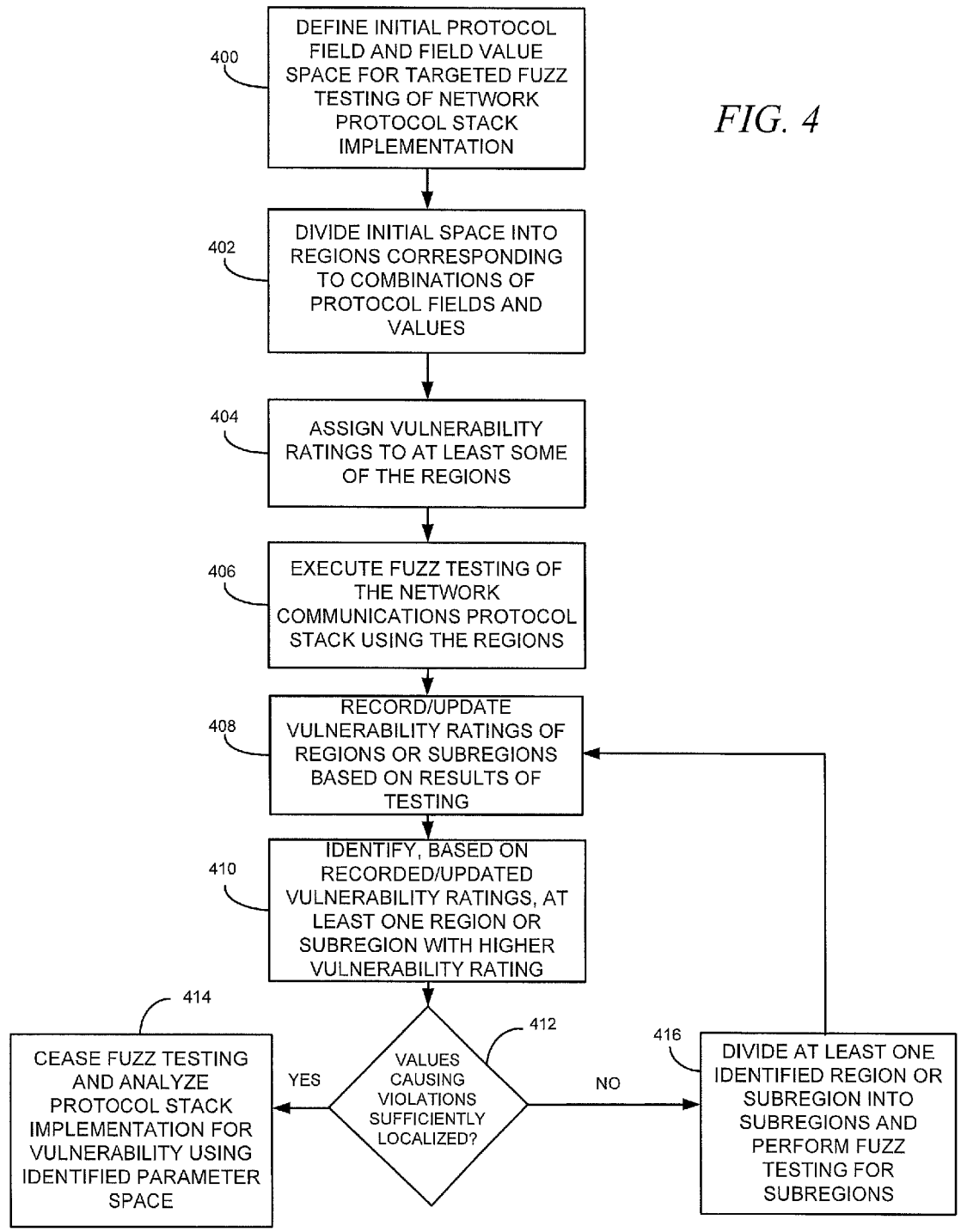
FIG. 4 is a flow chart illustrating an exemplary process for converging on network protocol stack vulnerability according to an embodiment of the subject matter described.

FIG. 4 is a flow chart illustrating an exemplary process for converging on network protocol stack vulnerabilities using fuzzing variables, variable ratings, and progressive convergence according to an embodiment of the subject matter described herein. Referring to FIG. 4, in step 400, an initial protocol and field value space is defined for fuzz testing of a network communications protocol stack implementation. For example, as illustrated in FIG. 3A, the initial target space may be a complete or relatively complete set of protocol fields and field values. In one example, the user may configure fuzzing for two variables in the IP and Internet control message protocol (ICMP) protocols. The fuzzed parameter variables for the two variables or fields may be defined as follows:

Protocols: IP, ICMP
Fields: IP-Fragment-Offset, UDP-Length
Values: IP-Fragment Offset [0-100]; UDP-Length[0-200]

In the above-listed example, the IP fragment offset and UDP length fields are the fields whose parameter values will be fuzzed. The fuzzed parameter values for the IP fragment offset range from zero to one hundred. The fuzzed parameter values for the UDP length field range from zero to two hundred. With these ranges of parameter values for the two different fields, the number of combinations of parameter values to be tested is 200×100 or 20,000 parameters.

In step 402, the initial space is divided into regions corresponding to combinations of protocol fields and field values. For example, as illustrated in FIG. 3B, the initial space is divided into regions 302. Each region 302 corresponds to a subset of protocol fields and field values that is smaller than the combinations in the initial set. Continuing with the IP-ICMP example, if the target space is divided into eight equally sized regions as illustrated in FIG. 3B, each region may correspond to 2500 of the 20,000 possible combinations of the IP fragment offset and UDP length parameter values.

In step 404, vulnerability ratings are assigned to at least some of the regions. The initial vulnerability ratings may be assigned by the user or by vulnerability ratings module 114. If no information is know about the initial vulnerability ratings of the regions, the initial vulnerability ratings of the regions may be initialized to be equal to each other. If it is known that a particular region has higher vulnerability or is otherwise of interest to the tester, the regions may be assigned a higher initial vulnerability than other regions.

In step 406, fuzz testing of a network communications protocol stack implementation is performed using the regions. For example, network equipment test device 100 may perform black box fuzz testing of protocol stack implementation 104 by sending test packets to device under test 102 with combinations of fuzzed protocol fields and field values corresponding to the combinations of protocol fields and field values for each region 302. Continuing with the IP-ICMP example, progressive fuzzer 116 may generate test ICMP over UDP/IP packets with IP fragment offset and UDP length values for the combinations corresponding to regions 302.

In step 408, the vulnerability ratings of the regions are updated based on results of the testing. As stated above, the vulnerability rating of each region may be incremented each time a failure or a transition to an invalid state occurs for one of the combinations of protocol fields and field values in the particular region being tested. The updating of vulnerability ratings may be performed by vulnerability ratings module 114 or by progressive fuzzer 116 based on results of the fuzz testing. Continuing with the ICMP-IP example, an updated vulnerability rating of each region of 2500 possible combinations of the UDP length and IP fragment offset is assigned an updated vulnerability rating based on the number of times a combination of values for these two parameters caused a change of state in the in the network protocol stack implementation being tested. In FIG. 3C, the updated vulnerability ratings range from 0 to 10.

In step 410, regions with vulnerability ratings higher than other regions are identified based on the updated vulnerability ratings of the regions. For example, as illustrated in FIG. 3C, region 302A has the highest vulnerability rating of 10.

In step 412, it is determined whether the parameter values causing the violations have been sufficiently localized. This step may be performed by reviewing the size of the regions or sub-regions and the clustering of the violations in the regions or sub-regions at the end of each fuzz testing iteration. Once a desired region/sub-region size and violation causing parameter value localization have been achieved, the fuzz testing can be stopped and further analysis independent of fuzz testing can be performed. In the ICMP-IP example, region 302A corresponds to 2500 possible combinations of the IP fragment offset and the UDP length. The user may stop the fuzz testing after the first iteration if 2500 is small enough for further analysis and the failures or protocol violations are sufficiently clustered in region 302A. As stated above, if the failures or protocol violations are not sufficiently clustered after a fuzz testing iteration, the fuzz testing may be stopped and the initial parameter space may be reconfigured.

If the violation causing parameter values have been sufficiently localized, control proceeds to step 414 where fuzz testing is ceased and the protocol implementation is analyzed based on the vulnerabilities identified during the fuzz testing. For example, fuzzer 112 may output the 2500 possible combinations of the field values that caused the 10 failures, and the user may analyze the code of the network protocol stack implementation for these possible values.

If in step 412 it is determined that the violation causing parameter values have not been sufficiently localized and the user desires to continue the fuzz testing, control proceeds to step 416 where the region is divided into sub-regions and then to steps 408-410 where the fuzz testing is performed for the sub-regions, the vulnerability ratings are generated and recorded for the sub-regions and it is determined whether the parameter values causing the failures are sufficiently localized after testing the sub-regions. For example, in FIG. 3D, region 302A is divided into 16 sub-regions. For the IP-ICMP example, region 302A includes 2500 combinations of parameter values. Thus, each sub-region of region 302A may include 2500/16 or 156.25 combinations (on average) of the IP fragment offset and the UDP length parameter values. The fuzz testing may be repeated for each sub-region of 156 parameter value combinations, vulnerability scores may be recorded, and sub-region 304A of region 302A may be identified as the sub-region with the highest vulnerability rating, as illustrated in FIG. 3E. If sub-region 304A is determined to sufficiently localize the violation causing parameter values, the fuzz testing may be stopped and code analysis relating to the 156 parameter value combinations may be identified. If sub-region 304A is determined not to sufficiently localize the violation causing parameter values, the parameter space may be further divided, and fuzz testing may be repeated for the divided sub-regions.

It should be noted that prior to performing each iteration of fuzz testing for a set of regions or sub-regions, vulnerability ratings for the regions or sub-regions may be initialized to a predetermined value so that the vulnerability ratings for the regions or sub-regions will reflect vulnerabilities caused in the current round of testing.

Figure 1:
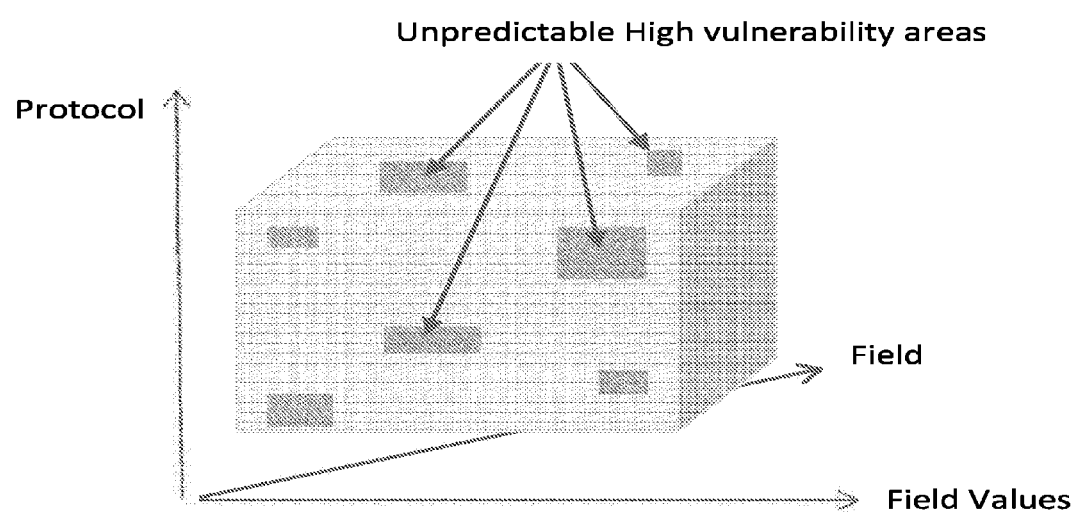
FIG. 1 is a graph illustrating protocol, field, and value space for brute force fuzz testing.

It should also be noted that the steps illustrated in FIG. 4 can be performed for multiple different sets of regions and sub-regions such that different sets of parameter value combinations that cause protocol stack failures are identified. For example, the steps illustrated in FIG. 4 can be executed in parallel to identify each of the localized shaded areas in FIG. 1 that result in protocol stack vulnerability.

Thus, using the steps illustrated in FIG. 4, the search for the protocol field/value space that causes errors in a network protocol stack implementation is progressively narrowed. Such progressive narrowing of the search for fields and values that cause vulnerabilities enables targeted analysis to be performed. A network equipment test device that implements progressive fuzzing using vulnerability ratings and progressive convergence improves the technological field of network equipment testing. A network equipment test device that implements the progressive fuzzing described herein also improves the functionality of the network equipment test device itself by decreasing the number of tests that are required to be performed to locate specific variables causing vulnerabilities.

It will be understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A method for converging on network protocol stack vulnerabilities using fuzzing variables, vulnerability ratings and progressive convergence, the method comprising:
    defining an initial protocol field and field value space for fuzz testing of a network communications protocol stack implementation;
    dividing the initial protocol field and field value space into regions corresponding to combinations of protocol fields and field values;
    assigning vulnerability ratings to at least some of the regions;
    executing fuzz testing of the network communications protocol stack implementation using the fields and field values defined by the regions;
    updating the vulnerability ratings of the regions based on results of the testing;
    identifying, based on the updated vulnerability ratings, at least one region with a higher vulnerability rating than other regions; and
    dividing the at least one region into sub-regions and performing fuzz testing of the sub-regions, wherein performing fuzz testing for the sub-regions includes:
    identifying at least one sub-region with a higher vulnerability rating than other sub-regions;
    determining whether violation causing parameter values are sufficiently localized in the at least one sub-region; and
    in response to determining that the violation causing parameter values are not sufficiently localized in the at least one sub-region, dividing the sub-region into sub-regions and performing fuzz testing for the sub-regions.

2. The method of claim 1 wherein the initial protocol field and field value space includes a combination of different network protocol fields and ranges of values for those fields.

3. The method of claim 2 wherein executing fuzz testing for the regions includes transmitting test packets to a device under test, wherein the test packets include fuzzed parameter values corresponding to the ranges for the different network protocol fields.

4. The method of claim 1 wherein dividing the initial space into regions includes dividing the initial space into regions that correspond to subsets of the initial protocol field and field value space.

5. The method of claim 1 wherein assigning vulnerability ratings to at least some of the regions includes receiving the vulnerability ratings from a user or automatically assigning the vulnerability ratings to the regions.

6. The method of claim 1 wherein executing fuzz testing of the network communications protocol stack implementation using the regions includes transmitting test packets to a device under test that includes the network communications protocol stack implementation, wherein the test packets include combinations of protocol fields and field values corresponding to the regions.

7. The method of claim 1 wherein updating the vulnerability ratings of the regions includes incrementing a vulnerability rating for a region each time fuzz testing with parameter values corresponding to the region causes the network communications protocol stack implementation to fail or transition to an invalid state.

8. The method of claim 1 comprising, in response to determining that the violation causing parameter values are sufficiently localized in the at least one sub-region, ceasing fuzz testing and analyzing the network communications protocol stack implementation for vulnerability using the identified parameter space.

9. A system for converging on network protocol stack vulnerabilities using fuzzing variables, vulnerability rating and progressive convergence, the system comprising:
   a computing platform including a processor and a memory;
   a progressive fuzzer stored in the memory and executed by the processor for defining an initial protocol field and field value space for fuzz testing of a network communications protocol stack implementation and dividing the initial space into regions corresponding to combinations of protocol fields and field values; and
   a vulnerability ratings module stored in the memory and executed by the processor for assigning vulnerability ratings to at least some of the regions, wherein the progressive fuzzer executes fuzz testing of the network communications protocol stack implementation using the fields and field values defined by the regions, wherein the vulnerability ratings module or the progressive fuzzer updates the vulnerability ratings of the regions based on results of the testing, wherein the progressive fuzzer identifies, based on the updated vulnerability ratings, at least one region with a higher vulnerability rating than other regions, divides the at least one regions into sub-regions and performing fuzz testing of the sub-regions, wherein, in performing the fuzz testing for the sub-regions, the progressive fuzzer:
   identifies at least one sub-region with a higher vulnerability rating than other sub-regions;
   determines whether violation causing parameter values are sufficiently localized to the at least one sub-region; and
   in response to determining that the violation causing parameter values are not sufficiently localized in the at least one identified sub-region, divides the sub-region into sub-regions and performs fuzz testing for the sub-regions of the identified sub-region.

10. The system of claim 9 wherein the initial protocol field and field value space includes a combination of different network protocol fields and ranges of values for those fields.

11. The system of claim 10 wherein, in performing fuzz testing for the regions, the progressive fuzzer transmits test packets to a device under test, wherein the test packets include fuzzed parameter values corresponding to the ranges for the different network protocol fields.

12. The system of claim 9 wherein the progressive fuzzer divides the initial space into regions that correspond to subsets of the initial protocol field and field value space.

13. The system of claim 9 wherein the vulnerability ratings module receives the vulnerability ratings for the regions from a user or automatically assigns the vulnerability ratings to the regions.

14. The system of claim 9 wherein the progressive fuzzer executes the fuzz testing of the network communications protocol stack implementation using the regions by transmitting test packets to a device under test that includes the network communications protocol stack implementation, wherein the test packets include combinations of protocol fields and field values corresponding to the regions.

15. The system of claim 9 wherein the vulnerability ratings module or the progressive fuzzer increments a vulnerability rating for a region each time fuzz testing with parameter values corresponding to the region causes the network communications protocol stack implementation to fail or transition to an invalid state.

16. The system of claim 9 wherein the progressive fuzzer is configured to cease the fuzz testing in response to determining that the violation causing parameter values are sufficiently localized to the identified sub-region.

17. A non-transitory computer readable medium having stored thereon executable instructions that when executed by the processor of a computer control the computer to perform steps comprising:
   defining an initial protocol field and field value space for fuzz testing of a network communications protocol stack implementation;
   dividing the initial space into regions corresponding to combinations of protocol fields and field values;
   assigning vulnerability ratings to at least some of the regions;
   executing fuzz testing of the network communications protocol stack implementation using the fields and field values defined by the regions;
   updating the vulnerability ratings of the regions based on results of the testing;
   identifying, based on the updated vulnerability ratings, at least one region with a higher vulnerability rating than other regions; and
   dividing the at least one region into sub-regions and performing fuzz testing of the sub-regions, wherein performing fuzz testing for the sub-regions includes:
   identifying at least one sub-region with a higher vulnerability rating than other sub-regions;
   determining whether violation causing parameter values are sufficiently localized in the at least one sub-region; and
   in response to determining that the violation causing parameter values are not sufficiently localized in the at least one sub-region, dividing the sub-region into sub-regions and performing fuzz testing for the sub-regions.

18. The non-transitory computer readable medium of claim 17 wherein the initial protocol field and field value space includes a combination of different network protocol fields and ranges of values for those fields.

* * * * *